United States Patent

[11] 3,626,210

[72] Inventor John R. Spence
Villa Park, Calif.
[21] Appl. No. 49,885
[22] Filed June 25, 1970
[45] Patented Dec. 7, 1971
[73] Assignee North American Rockwell Corporation

[54] THREE-PHASE CLOCK SIGNAL GENERATOR USING TWO-PHASE CLOCK SIGNALS

5 Claims, 3 Drawing Figs.

[52] U.S. Cl. ........................................................ 307/269,
307/205, 307/246, 307/251, 307/265, 307/270, 328/63
[51] Int. Cl. ........................................................ H03k 17/60
[50] Field of Search ........................................................ 328/54, 63, 173, 176; 330/156; 307/205, 208, 237, 246, 251, 265, 269, 270, 304

[56] References Cited

UNITED STATES PATENTS

| | | | |
|---|---|---|---|
| 3,522,454 | 8/1970 | Gilmour | 307/265 |
| 3,536,936 | 10/1970 | Rubinstein et al. | 307/265 X |
| 3,502,908 | 3/1970 | Christensen | 307/205 X |
| 3,518,451 | 6/1970 | Booher | 307/208 X |
| 3,524,077 | 8/1970 | Kaufman | 307/205 X |

*Primary Examiner*—Stanley T. Krawczewicz
*Attorneys*—L. Lee Humphries, H. Fredrick Hamann and Robert G. Rogers

ABSTRACT: A first bootstrapped field effect transistor drives the output to a true voltage level during a first phase of a (two-phase) multiple phase clocking scheme. A second bootstrapped field effect transistor, turned on when the output was driven true, remains on for a second consecutive phase for maintaining the true voltage level at the output. During a third consecutive phase, a third field effect transistor is turned on. The second and third field effect transistors maintain the output at said true voltage level during the third consecutive phase. The third field effect transistor drives the output to a false voltage level during a fourth consecutive phase. Thereafter the cycle is repeated. The field effect transistors comprising the generator are gated by the major (double width, or two-phase) clock signals which have overlapping phases.

TABLE 1

| | | | |
|---|---|---|---|
| $\phi_{3+4+1}$ | $\phi_{2+3}$ | $\phi_{3+4}$ | $\phi_{4+1}$ |
| $\phi_{4+1+2}$ | $\phi_{3+4}$ | $\phi_{4+1}$ | $\phi_{1+2}$ |
| $\phi_{1+2+3}$ | $\phi_{4+1}$ | $\phi_{1+2}$ | $\phi_{2+3}$ |
| $\phi_{2+3+4}$ | $\phi_{1+2}$ | $\phi_{2+3}$ | $\phi_{3+4}$ |

INVENTOR.
JOHN R. SPENCE
BY
Robert G. Rogers
ATTORNEY

INVENTOR.
JOHN R. SPENCE
BY Robert G. Rogers
ATTORNEY

THREE-PHASE CLOCK SIGNAL GENERATOR USING TWO-PHASE CLOCK SIGNALS

BACKGROUND OF THE INVENTION

1. Field of the Invention

The invention relates to a three-phase (triple width) clock signal generator using major (double width) clock signals and more particularly to such a generator in which a plurality of field effect transistors gated by double width clock signals having overlapping phases sets the output to a first logic level for three consecutive phase times followed by one-phase time at a different logic level.

2. Description of Prior Art

In the usual application involving multiple-phase clocking schemes, an electronic system may require single-phase clock signals such as $\Phi_1$, $\Phi_2$, $\Phi_3$, and $\Phi_4$ and/or two-phase (double width) clocking signals such as $\Phi_{1+2}$, $\Phi_{2+3}$, $\Phi_{3+4}$, and $\Phi_{4+1}$. The single-phase clock signals are often called minor clock signals, or minor phase clock signals whereas the two-phase clock signals are called major clock signals, or major phase clock signals. The use of single-phase and/or two-phase clock signals may be described as a multiple-phase clocking, or gating, scheme.

Occasionally however in electronic systems it is necessary to provide a clock signal having a phase width which is wide relative to the phase width of other clocking signals used by the system. For example, a clock signal having a width equivalent to three phases (triple width) may be required in a system that also uses both minor and major clock signals as described above. Such a triple-phase clock signal can be used advantageously as an address gate in a read-write memory cell or as an isolation clock in a four-phase gate which requires double evaluation time for inputs.

A circuit for generating such a clock preferably dissipates minimum power and provides an output signal (three-phase) which is synchronized with the phases of the major clock signals of the system and which has a signal level equal to the signal level of the major clock signals. In addition, the circuit should be capable of generating the triple-phase clock signal with a relatively high-speed response at the output of the circuit so that the separation time between adjacent clock phases is maintained.

SUMMARY OF THE INVENTION

Briefly, the invention comprises a circuit for generating a clock signal having a three-phase time interval at one logic level followed by a one-phase time interval at a different logic level. The circuit is gated by two-phase clocking signals implementing a multiple-phase clocking scheme. The two-phase clock signals have consecutive and overlapping phases.

The circuit includes a first bootstrap field effect transistor means controlled by first two-phase clock signal for setting the output to a first logic level during a first-phase time of the two-phase clock signals. A second bootstrapped field effect transistor means hold the output at said first logic level during a second consecutive phase time. During a third consecutive phase time, a third field effect transistor in conjunction with the second bootstrap transistor means maintains the output at said first logical level. During a fourth consecutive phase time, the third field effect transistor sets the output to a second logical level. During the fourth-phase time, the bootstrap capacitors of the first and second field effect transistor means are being precharged for turning the first and second field effect transistor means on during the succeeding first-phase time of the next cycle.

An example of a bootstrap driver can be seen by referring to U.S. Pat. application Ser. No. 789,441 for "An Isolation Circuit for Gating Devices" by R. W. Polkinghorn et al., filed on Jan. 6, 1969, now U.S. Pat. No. 3,579,275.

Therefore, it is an object of this invention to provide a circuit for generating a three-phase clock signal using a multiple-phase clocking scheme implemented by two-phase clock signals.

It is another object of this invention to generate a three-phase clock synchronized with and controlled by two-phase (double width) clock signals.

Still another object of this invention is to provide a triple width clock signal generator which is gated by double width clock signals each having overlapping phases.

Still another object of this invention is to provide a three-phase clock generator using major clock signals and which has a relatively high-speed response for maintaining a separation between adjacent phases of the clock signals.

It is still another object of this invention to provide a three-phase clock signal generator using major phase clock signals without dissipating substantial power and which provides said three-phase clock signal with a signal level equal to the signal level of said major phase clock signals.

A still further object of this invention is to provide a three-phase clock signal generator gated by a multiple-phase clocking scheme having overlapping major clock signals.

These and other objects of the invention will become more apparent when taken in connection with the description of the drawings, a brief description of which follows:

DESCRIPTION OF PREFERRED EMBODIMENTS

Figures 1, 3:
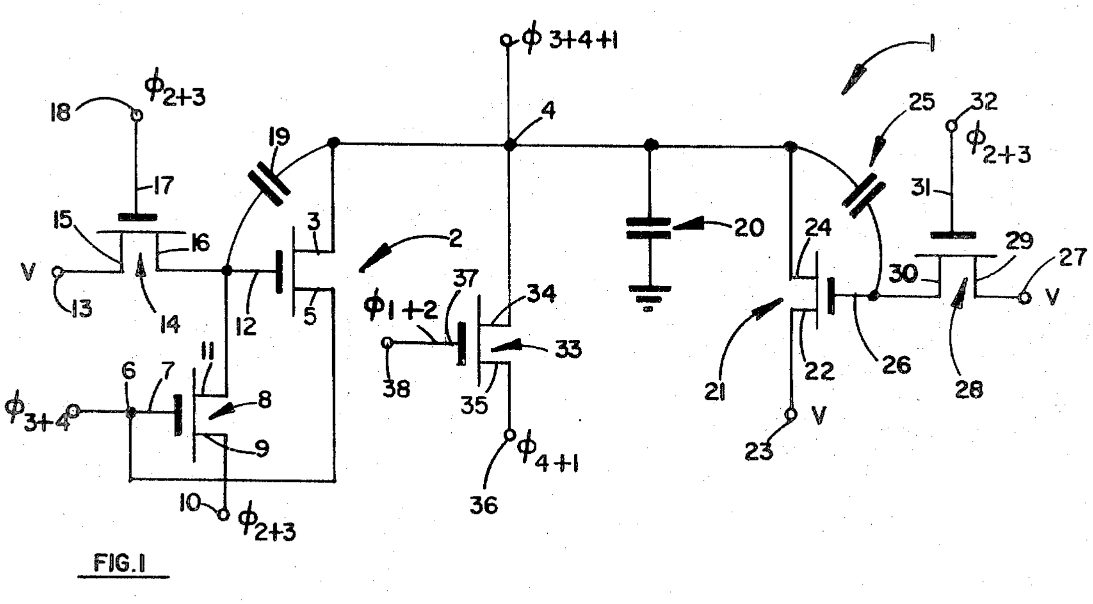
FIG. 1 is a schematic diagram of one embodiment of a three-phase clock signal generator gated by a multiple-phase clocking scheme comprising major clock signals.
FIG. 3 is a table showing the relationship of three-phase clock signal generated by various embodiments of FIG. 1 circuit.

FIG. 1 is a circuit diagram of one embodiment of three-phase clock signal generator 1 comprising transistor 2 having its source electrode 3 connected to output 4 and its drain electrode 5 connected to input 6 for the major clock signal $\Phi_{3+4}$. The gate electrode 7 of field effect transistor 8 is also connected to input 6. The drain electrode 9 of field effect transistor 8 is connected to input 10 for major clock signal $\Phi_{2+3}$ and its source electrode 11 is connected to gate electrode 12 of field effect transistor 2.

The gate electrode 12 of field effect transistor 2 is also connected to input 13 for the voltage level V through field effect transistor 14. The drain electrode 15 of field effect transistor 14 is connected to input 13 and its source electrode 16 is connected to the gate electrode 12 of field effect transistor 2. The gate electrode 17 of field effect transistor 14 is connected to input 18 for major clock signal $\Phi_{2+3}$.

Feedback capacitor 19 is connected between output 4 and therefore source electrode 3 of field effect transistor 2 and the gate electrode 12 of field effect transistor 2 for feeding back the output voltage to the gate electrode 12. The feedback voltage substantially enhances the conduction of field effect transistor 2 during certain time intervals as explained in connection with FIG. 2 for driving the output 4 to a voltage level equal to the voltage level of the major clock signals.

Capacitor 20 is shown connected between the output 4 and ground. The capacitor represents the load capacitance connected to the output and may be comprised of interelectrode capacitance of field effect transistors, stray capacitance comprising conductors, etc. and other inherent capacitance of the load.

Second bootstrapped field effect transistor 21 is connected between output 4 and voltage level V. The field effect transistor 21 has its drain electrode 22 connected to input 23 for the voltage V and its source electrode 24 connected to output 4. Feedback capacitor 25 is connected between the source electrode 24 and therefore the output, and gate electrode 26 of the field effect transistor 21. The operation of the bootstrap, or feedback capacitor is substantially the same as the operation described in connection with field effect transistor 2.

The gate electrode 26 of field effect transistor 21 is connected to input 27 for voltage level V through field effect transistor 28. Field effect transistor 28 has its drain electrode 29 connected to input 27 and its source electrode 30 connected to the gate electrode 26 of field effect transistor 21. The gate electrode 31 of field effect transistor 28 is connected to input 32 for major clock signal $\Phi_{2+3}$.

Field effect transistor 33 has its source electrode 34 connected to the output and its drain electrode 35 connected to input 36 for major clock signals $\Phi_{4+1}$. Gate electrode 37 of field effect transistor 33 is connected to input 38 for major clock signal $\Phi_{1+2}$.

Figure 2:
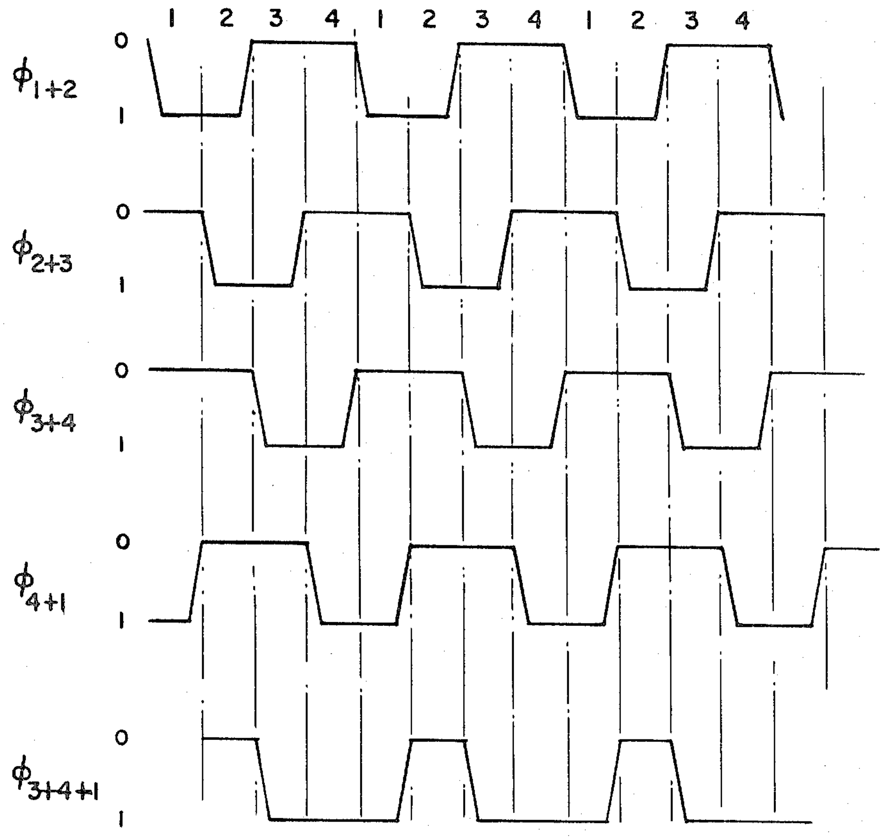
FIG. 2 is a diagram of the signals taken at the various points in the FIG. 1 circuit.

The operation of the FIG. 1 circuit can best be described by referring to FIG. 2 which shows the phase relationship between the major clock signals. The legend at the top of FIG. 2 identifies the phases of the clock signal. As indicated by the legend, the multiple-phase clocking scheme uses four phases. In other words, a clocking cycle begins with a $\Phi_1$ and ends with $\Phi_4$. Afterwards, the cycle is repeated. The logical levels of the major clock signals and the triple-phase clock signal, $\Phi_{3+41}$, are identified by the "1" and "0" designation at the left of the identified clock signals.

For purposes of describing the FIG. 1 embodiment, a logic 1, or true state, is identified by a relatively negative level of a clock signal whereas the logic 0, or false state, of a clock signal is identified by a relatively positive level. If the FIG. 1 circuit is implemented by P-channel field effect transistors such as MOS devices, the true state would be a negative voltage level and the false phase would be electrical ground. If N-channel field effect transistors are used to implement the FIG. 1 circuit, the logical designation might be reversed. In other words, a true state might be a positive voltage level whereas a false state might be electrical ground or a negative voltage level. In various embodiments, N-channel, P-channel or a combination of both types of devices with corresponding supply voltages and clocking signals can be used to implement a FIG. 1 three-phase clock signal generator.

For purposes of describing the operation of the FIG. 1 circuit, it is assumed that the $\Phi_{2+3}$ clock signal is true. As a result, field effect transistors 14 and 28 are on and capacitors 19 and 25 are charged to the voltage level V minus the threshold drop across transistors 14 and 28. It is assumed that the voltage level V minus the threshold loss is sufficient to turn transistors 21 and 2 on. However, at $\Phi_2$ time, the $\Phi_{1+2}$ clock signal turn transistor 33 so that the output 4 is held at the ground level of the $\Phi_{4+1}$ signal on input 36 during the $\Phi_2$ interval.

Field effect transistor 21 is also turned on. However, by making field effect transistor 21 with a small conductance relative to transistor 33, substantially all of the voltage V is dropped across transistor 21 so that the output false level is not changed.

During the $\Phi_3$ phase, clock signal $\Phi_{3+4}$ becomes true and clock signal $\Phi_{2+3}$ remains true. Field effect transistor 33 is turned off so that it does not affect the output. The output 4 is driven toward the signal level of $\Phi_{3+4}$ minus the threshold drop through field effect transistor 2. However, the change in the voltage at the output from electrical ground towards a negative going signal causes a corresponding change across capacitors 19 and 25 and there is therefore a substantial change at the gate electrodes of field effect transistors 2 and 21. The substantial change due to the feedback across capacitors 19 and 25 enhances the conduction of transistors 2 and 21 for driving the output to the signal level of the $\Phi_{3+4}$ signal. It is assumed that V and $\Phi_{3+4}$ signal level are approximately equal. As a result, transistor 21 provides load current for the output.

By making field effect transistor 2 relatively large i.e. low resistance, the output 4 drops relatively fast to the true level shown in FIG. 2. In other words, the circuit has a relatively short response time to change from a false signal level to a true signal level. As a result, the changes does not cause an overlap between adjacent phases of the multiple-phase clocking scheme. The response time is affected by the RC time constant at the output which is comprised of load capacitance 20 and the resistance of the transistors 2 and 21.

During the $\Phi_4$ phase, the clock signal $\Phi_{2+3}$ becomes false. Since field effect transistor 8 remains on the gate electrode 12 is connected to a false signal level and field effect transistor 2 is turned off. Field effect transistor 33 also remains off since $\Phi_{1+2}$ is false during $\Phi_4$ time. However, field effect transistor 21 remains on for maintaining the output at the true voltage level during the $\Phi_4$ phase time.

During the next consecutive phase which is $\Phi_1$, field effect transistor 33 turns on since the $\Phi_{1+2}$ major clock signal is true. When field effect transistor 33 turns on, the $\Phi_{4+1}$ clock signal, true during $\Phi_1$ time, provides a true signal level on output 4 in conjunction with the drive provided by field effect transistor 21. Although a threshold drop occurs across field effect transistor 33, the voltage level is maintained by the field effect transistor 21. Field effect transistor 33 helps supply additional current for maintaining the level at the voltage level set by the relatively smaller field effect transistor 21.

Therefore, as indicated and as shown in FIG. 2, the output 4 is set true at the beginning of $\Phi_3$ time and is maintained at the true logical level for three consecutive phases. At the end of the third consecutive phase, $\Phi_1$, the clock signal $\Phi_{4+1}$ becomes false. Since transistor 33 remains on, the output 4 is set to the false level of the $\Phi_{4+1}$ clock signal. The change from a true signal level to a false signal level is shown in FIG. 2.

As indicated in the FIG., the false signal level occurs during $\Phi_2$ which is the next consecutive phase time after $\Phi_1$. It is pointed out however that capacitors 19 and 25 are being charged during the $\Phi_2$ time interval since transistors 14 and 28 are turned on as previously described. Therefore, after the $\Phi_2$ false interval the output is again driven true for three consecutive phase time as described.

FIG. 3 illustrates which major clock signals i.e. which two-phase clock signals must be used to gate FIG. 1 circuit for producing three-phase (triple width) clock signals at the output. For example, the $\Phi_{3+4+1}$ triple-phase clock signal can be generated by the $\Phi_{2+3}$, $\Phi_{3+4}$, and $\Phi_{4+1}$ clock signals at the inputs described in connection with FIG. 1. In order to generate $\Phi_{4+12}$; $\Phi_{1+2+3}$; and $\Phi_{2+3+4}$ triple-phase clock signals, the $\Phi_{3+4}$; $\Phi_{4+1}\Phi_{1+2}$ two-phase clock signals replace the $\Phi_{2+3}$ clock signal. Similarly, $\Phi_{4+1}$, $\Phi_{1+2}$, and $\Phi_{2+3}$, replace the $\Phi_{3+4}$ clock signal as shown in the table and the $\Phi_{1+2}$, $\Phi_{2+3}$, and $\Phi_{3+4}$ clock signals replace the $\Phi_{4+1}$ clock signal.

I claim:

1. A three-phase clock signal generator gated by two-phase clock signals comprising a multiple-phase clocking scheme, said generator having an output and comprising, a first field effect transistor means connected between said output and a first two-phase clocking signal for driving said output to a first logical level during a first phase of said first two-phase clock signal, a second field effect transistor means connected between said output and a voltage level for maintaining the output at said first logical level during second and third consecutive phases of said two-phase clock signals, said second field effect transistor means having a gate electrode, a storage capacitor for supplying a drive voltage to said gate electrode during said second and third consecutive phases, said second field effect transistor means further including circuit means responsive to a second two-phase clock signal for charging said storage capacitor prior to said first phase, a third field effect transistor means including a gate electrode responsive to a third two-phase clock signal for driving said output to a second logical level during a fourth consecutive phase of said two-phase clock signals, said first recited phase following said fourth recited phase, said output connected at a common point between said first, second and third field effect transistor means.

2. A three-phase clock signal generator gated by two-phase clock signals comprising a multiple-phase clocking scheme, said generator having an output and comprising, a first field effect transistor means for driving said output to a first logical level during a first phase of said two-phase clock signals, said first field effect transistor means is connected between said output and a first two-phase clock signal, said first field effect transistor means including feedback capacitor means connected between the output and the gate electrode of said first field effect transistor means for driving said output to the signal level of a first two-phase clock signal during said first phase, a second field effect transistor means for maintaining the output at said first logical level during second and third consecutive phases of said two-phase clock signals, said second field effect transistor means is connected between said output and a voltage level and includes feedback capacitor means connected between the output and gate electrode of said second field effect transistor means for overcoming the threshold losses through said second field effect transistor means, a third field effect transistor means for driving said output to a second logical level during a fourth consecutive phase of said two-phase clock signals, said first recited phase following said fourth recited phase, said third field effect transistor means is connected between said output and a second two-phase clock signal, said third field effect transistor means having its gate electrode connected to a third two-phase clock signal, said second two-phase clock signal and third two-phase clock signal having an overlapping phase whereby during said fourth consecutive phase said third field effect transistor means drives said output to the signal level of said second two-phase clock signal, said signal level being approximately equal to said second logical level during said fourth consecutive phase.

3. The generator recited in claim 2 and further including a fourth field effect transistor means connected between the gate electrode of said first field effect transistor means and a fourth two-phase clock signal, said fourth field effect transistor means having its gate electrode connected to said first two-phase clock signal, said first and fourth two-phase clock signals having one overlapping phase whereby said first recited field effect transistor means becomes conductive during said first recited phase for driving said output to the signal level of said first two-phase clock signal, said signal level being equal to said first recited logical level.

4. The generator recited in claim 3 wherein said three-phase clock signal generator includes fifth and sixth field effect transistor means individually connected between the gate electrodes of said first and second field effect transistor means respectively and a voltage level, said fifth and sixth field effect transistor means having their gate electrodes connected to said fourth two-phase clock signal for applying approximately said voltage level to the gate electrodes of said first and second field effect transistor means during said fourth recited phase whereby said feedback capacitors are precharged prior to receiving a feedback from said output during said first phase.

5. The generator recited in claim 4 wherein said first, second, third and fourth recited two-phase clock signals are $\Phi_{3+4}\Phi_{4+1}$, $\Phi_{1+2}$, and $\Phi_{2+3}$, respectively for generating a three-phase clock signal $\Phi_{3+4+1}$, and said first, second, third, and fourth two-phase clock signals are $_{4+1}$, $\Phi_{1+2}$, $\Phi_{2+3}$, and $\Phi_{3+4}$, for generating a three-phase clock signal $\Phi_{4+1+2}$, and said first, second, third, and fourth two-phase clock signals are $\Phi_{1+2}$, $\Phi_{2+3}\Phi_{3+4}$, and $\Phi_{4+1}$, for generating the three-phase clock signal $\Phi_{1+2+3}$, and said first, second, third and fourth two-phase clock signals are $\Phi_{2+3}$, $\Phi_{3+4}$, $\Phi_{4+1}$, and $\Phi_{1+2}$, for generating a three-phase clock signal $\Phi_{2+3+4}$.

* * * * *